United States Patent
Viens

(10) Patent No.: US 10,113,413 B2
(45) Date of Patent: Oct. 30, 2018

(54) METHOD AND APPARATUS FOR DETERMINING WELLBORE POSITION

(71) Applicant: Nabors Drilling Technologies USA, Inc., Houston, TX (US)

(72) Inventor: Christopher Viens, Houston, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 458 days.

(21) Appl. No.: 14/928,198

(22) Filed: Oct. 30, 2015

(65) Prior Publication Data

US 2016/0123134 A1    May 5, 2016

Related U.S. Application Data

(60) Provisional application No. 62/073,672, filed on Oct. 31, 2014.

(51) Int. Cl.
| | | |
|---|---|---|
| *E21B 47/022* | (2012.01) | |
| *E21B 7/04* | (2006.01) | |
| *G01C 7/06* | (2006.01) | |

(52) U.S. Cl.
CPC ............. *E21B 47/022* (2013.01); *E21B 7/04* (2013.01); *G01C 7/06* (2013.01)

(58) Field of Classification Search
CPC .......... E21B 47/022; E21B 7/04; E21B 44/02; E21B 44/00; E21B 47/04; E21B 7/068; G01C 21/00
See application file for complete search history.

(56) References Cited

U.S. PATENT DOCUMENTS

| | | | | |
|---|---|---|---|---|
| 6,179,067 B1* | 1/2001 | Brooks | ................. | E21B 47/022 175/45 |
| 6,405,808 B1* | 6/2002 | Edwards | ............... | E21B 47/022 175/45 |
| 6,633,816 B2 | 10/2003 | Shirasaka et al. | | |
| 6,944,545 B2* | 9/2005 | Close | .................... | E21B 47/022 702/179 |
| 7,243,719 B2* | 7/2007 | Baron | ....................... | E21B 7/04 166/255.2 |
| 7,823,655 B2* | 11/2010 | Boone | ....................... | E21B 7/04 175/26 |
| 7,886,844 B2 | 2/2011 | Phillips | | |
| 8,442,769 B2 | 5/2013 | Phillips et al. | | |
| 8,672,055 B2* | 3/2014 | Boone | ..................... | E21B 44/02 175/26 |
| 9,784,089 B2* | 10/2017 | Boone | ..................... | E21B 44/02 |
| 2016/0123134 A1* | 5/2016 | Viens | ....................... | E21B 7/04 175/45 |
| 2016/0327680 A1* | 11/2016 | Jain | ......................... | G01V 5/101 |
| 2017/0152739 A1* | 6/2017 | Benson | .................... | E21B 47/04 |
| 2017/0306702 A1* | 10/2017 | Summers | ................ | E21B 7/068 |

* cited by examiner

*Primary Examiner* — Daniel P Stephenson
(74) *Attorney, Agent, or Firm* — Enrique Abarca; Abel Law Group, LLP

(57) ABSTRACT

An improved method and apparatus for determining wellbore position in deviated or horizontal wells. Continuous inclination values captured while drilling can be used to provide a more accurate model of a wellbore path, particularly true vertical depth, than would be produced using conventional methods of measuring inclination only at static survey points.

19 Claims, 5 Drawing Sheets

US 10,113,413 B2

METHOD AND APPARATUS FOR DETERMINING WELLBORE POSITION

CROSS-REFERENCE TO RELATED APPLICATION(S)

This application claims priority under 35 U.S.C. § 119(e) to U.S. Patent Application No. 62/073,672, entitled "METHOD AND APPARATUS FOR DETERMINING WELLBORE POSITION," by Christopher Viens, filed Oct. 31, 2014, which is assigned to the current assignee hereof and incorporated herein by reference in its entirety.

FIELD OF THE DISCLOSURE

The present disclosure is directed to determining wellbore position. More specifically, but without limitation, this invention relates to determining the true vertical depth along the wellbore path of a deviated or horizontal well.

BACKGROUND

Operators drill wells many thousands of feet in the search for hydrocarbons. The wells are expensive and take a significant amount of time to plan. To obtain hydrocarbons such as oil and gas, boreholes are drilled by rotating a drill bit attached to a drill string. The drill bit is typically mounted on the lower end of the drill string as part of a bottom-hole assembly (BHA) and is rotated by rotating the drill string at the surface and/or by actuation of down-hole motors or turbines.

A substantial number of wells being drilled today have a wellbore path that deviates from the traditional vertical wellbores that were more common before the 1970s. Often, deviated wells are classified as horizontal wells, meaning that such wells have a wellbore path that deviates to horizontal (for example, an inclination of around 70° to 110° from vertical). Often deviated wells are used in unconventional drilling applications such as recovery of hydrocarbons from shale, oil sands, or other alternatives to conventional hydrocarbon reservoirs.

The process of steering a wellbore away from the normal vertical path so that it travels in a desired direction is referred to as "directional drilling." Most horizontal wells begin at the surface as a vertical well. Drilling progresses until the drill bit reaches a desired depth. At that point the drill bit can be steered using, for example, a mud motor to control the drilling angle. For horizontal wells, the bit will be typically steered to change the wellbore orientation from vertical to a desired deviated angle (such as horizontal) over a distance of several hundred feet. In many cases, straight ahead drilling can be resumed at that point, with various downhole measurement-while-drilling (MWD) instruments used to monitor the drilling path so that additional steering corrections can be made where needed.

Especially for horizontal and deviated wells, it is often difficult to accurately determine the exact trajectory of the wellbore underneath the surface due to inaccuracies in conventional MWD survey data. Accurate knowledge of the location of the wellbore is essential to both hitting the desired target during drilling and avoiding collisions with adjacent wells. Determination of the true vertical depth (TVD) along a wellbore is also needed to allow accurate geological mapping of reservoirs or other geological formations and to fulfill requirements of various regulatory agencies. Because conventional MWD surveys do not provide sufficient positioning accuracy, it is often necessary to conduct a separate final survey of wellbore position, for example using gyroscopic survey tools. This type of additional final survey interrupts the drilling process and thus increases costs.

What is needed is an improved method and apparatus for determining wellbore position in deviated or horizontal wells.

BRIEF DESCRIPTION OF THE DRAWINGS

The present disclosure may be better understood, and its numerous features and advantages made apparent to those skilled in the art by referencing the accompanying drawings.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

Embodiments of the present invention are directed at an improved method and apparatus for determining wellbore position in deviated or horizontal wells. Continuous inclination values captured while drilling can be used to provide a more accurate model of a wellbore path, particularly true vertical depth, than would be produced using conventional methods of measuring inclination only at static survey points.

Embodiments described herein are especially useful where a number of wells are drilled relatively close together. In such cases it is essential that you know the exact position (especially the true vertical depth) at every point along wellbore. Embodiments are also useful for any diverted or horizontal drilling where you have to hit a target. More accurate regional modelling is also possible using the embodiments described herein because all wells in the region will be mapped using more accurate positional data, especially with respect to true vertical depth for deviated or horizontal portions of the wells.

Figure 1:
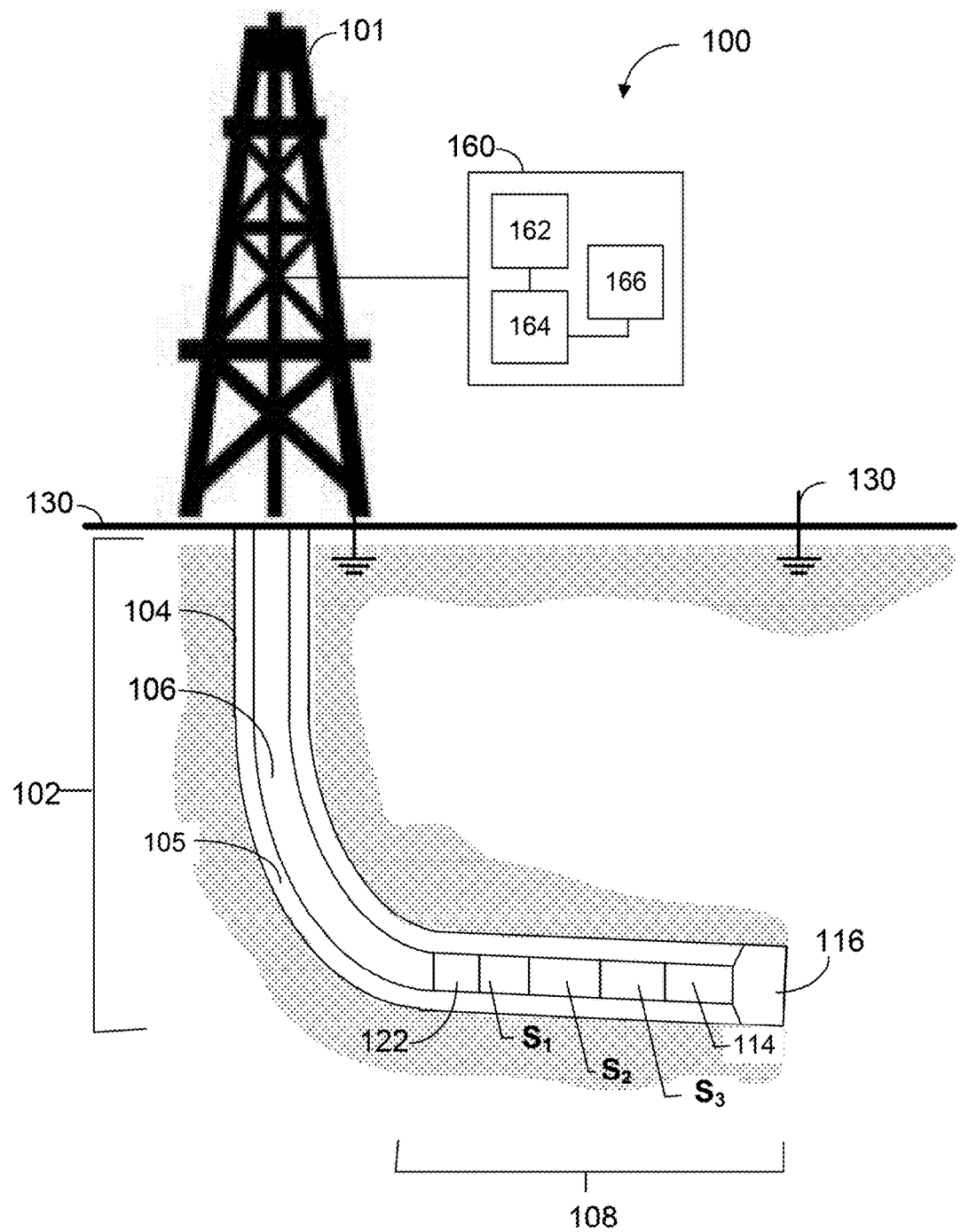
FIG. 1 is a simplified schematic illustration of a drilling system 100 that can be used in unconventional drilling operations such as horizontal drilling according to an embodiment.

FIG. 1 is a simplified schematic illustration of a drilling system 100 that can be used in unconventional drilling operations such as horizontal drilling according to an embodiment. A derrick 101 supports and rotates the drill string 102 in order to actually drill the well. The terms well, wellbore, and borehole are used herein as synonyms. The drill string 102, which is suspended within the borehole 104 once drilling is commenced, comprises a number of tubular sections connected together, with a drill bit 116 attached at the bottom of the drill string. The lowest part of the drill string, extending from the drill bit to the drill pipe, is referred to as the bottom-hole assembly ("BHA") 108. As used herein, terms such as "top," "up," "upper," "upwardly,"

or "upstream" will mean toward the surface of the well and terms such as "bottom," "down," "lower," "downwardly," or "downstream" will mean toward the terminal end of the well, regardless of the well-bore orientation.

A typical BHA can include the drill bit, a mud motor, a BHA sensor assembly (including MWD and LWD components), various connectors and subs, and a number of heavy weight drill collars (pipes) used to apply weight to the bit. The length of a conventional BHA assembly, including the number of heavy collars, can be from about 200 to about 400 feet.

A rotary table or a top drive (not shown) coupled to the drill string 102 may be utilized to rotate the drill string 102 at the surface to rotate the BHA 108 and thus the drill bit 116 to drill the borehole 104. A drilling motor 114 (also referred to as "mud motors") may also be provided to help rotate the drill bit. To operate the mud motor, a drilling fluid (often referred to as mud) from a source 170 is pumped under pressure into the drill pipe 106. The drilling fluid passes through flow bores throughout the length of the BHA and discharges at the bottom of the drill bit 116. The mud flow returns to the surface via the annular space 105 (also referred as the "annulus") between the drill string 102 and the inside wall of the borehole 104.

The BHA can also include one or more MWD and/or LWD sensors $S_1$, $S_2$, $S_3$ and related circuitry for measuring or determining one or more parameters relating to a formation being drilled. Such sensors can include, for example, tri-axial accelerometers to measure inclination and tri-axial magnetometer packages to measure direction (Azimuth).

The use of sensors during the drilling operation to provide information related to positioning or steering the drill, such as direction, orientation and drill bit information, is referred to as "Measurement While Drilling" (MWD). The phrase "Logging While Drilling" (LWD) is often used to refer to the use of sensors for petrophysical or geological measurements during drilling. As used herein, "MWD" will also be used to encompass LWD applications unless otherwise specified.

A telemetry system 122 can be used to process signals from the LWD and MWD sensors and transmit the data to the surface in real time. Data transmission methods may include, for example, digitally encoding data and transmitting the encoded data to the surface, possibly as pressure pulses in the drilling fluid or mud system, acoustic transmission through the drill string, electronic transmission through a wireline or wired pipe, and/or transmission as electromagnetic (EM) pulses. The LWD and MWD sensors and/or other portions of the BHA may also have the ability to store memory data for later retrieval when the drill string is removed from the wellbore. The embodiments described herein can be practiced using real time data (transmitted to the surface during drilling) or memory data (stored and retrieved when drill string is removed).

A control unit (or controller) 160, which may be a computer-based unit, may be placed at the surface 130 for receiving and processing data transmitted by the sensors in the drill bit and other sensors in the drilling assembly 130 and for controlling selected operations of the various devices and sensors in the BHA 108. The surface controller 160, in one embodiment, may include a processor 162 for implementing steps in a method for determining wellbore character or true vertical depth as described herein, a data storage device (or a computer-readable medium) 164 for storing data and computer programs 166. Controller 160 can also include a monitor and input devices (such as a keyboard and mouse) so that controller 160 can also function as a human-machine interface for viewing data and inputting commands.

Controller 160 may also pass received and/or processed data to other systems that perform a variety of known control and reporting functions. The data storage device 164 may be any suitable device, including, but not limited to, a read-only memory (ROM), a random-access memory (RAM), a flash memory, a magnetic tape, a hard disc and an optical disk.

The 3D path of a wellbore (including true vertical depth) can be determined from the inclination, azimuth, and length (depth) of the wellbore at a series of points along the wellbore. As used herein, the term "True Vertical Depth" (TVD) refers to the vertical distance from a given point in a wellbore to a reference point at the surface. The inclination of the wellbore, which refers to the angle of the long axis of the wellbore relative to vertical (the direction of the Earth's gravitational field), can be determined using an accelerometer to measure the gravitational force vector along the sensing axis of the accelerometer, which varies with changes in the inclination of the accelerometer sensing axis. Because the accelerometer is mounted within the BHA, the inclination of the accelerometer (along the long axis of the BHA), which will be the same as the inclination of the borehole itself at the same position.

The azimuth (or compass direction) can be calculated by determining the horizontal angle between the axis of the tool and the direction of magnetic north. A three-axis magnetometer can be used to measure the direction of the Earth's magnetic field relative to the tool (BHA) axis. Finally, the length (referred to herein as "measured depth") of the wellbore from the surface to the point being measured is usually determined by measuring the length of the drill string that has been lowered into the wellbore, which is usually read from the winch when lowering the tool down the drillhole.

In conventional drilling applications, values for wellbore inclination, azimuth, and length are determined from measurements made in "static" surveys that are performed when drilling is stopped or interrupted, typically when additional lengths of drillpipe are added to the drillstring. Usually, for diverted or horizontal drilling applications, static surveys are performed every 90 feet as the wellbore is drilled, although in some instances static surveys may be performed more often such as every 50 feet or less.

Figure 2:
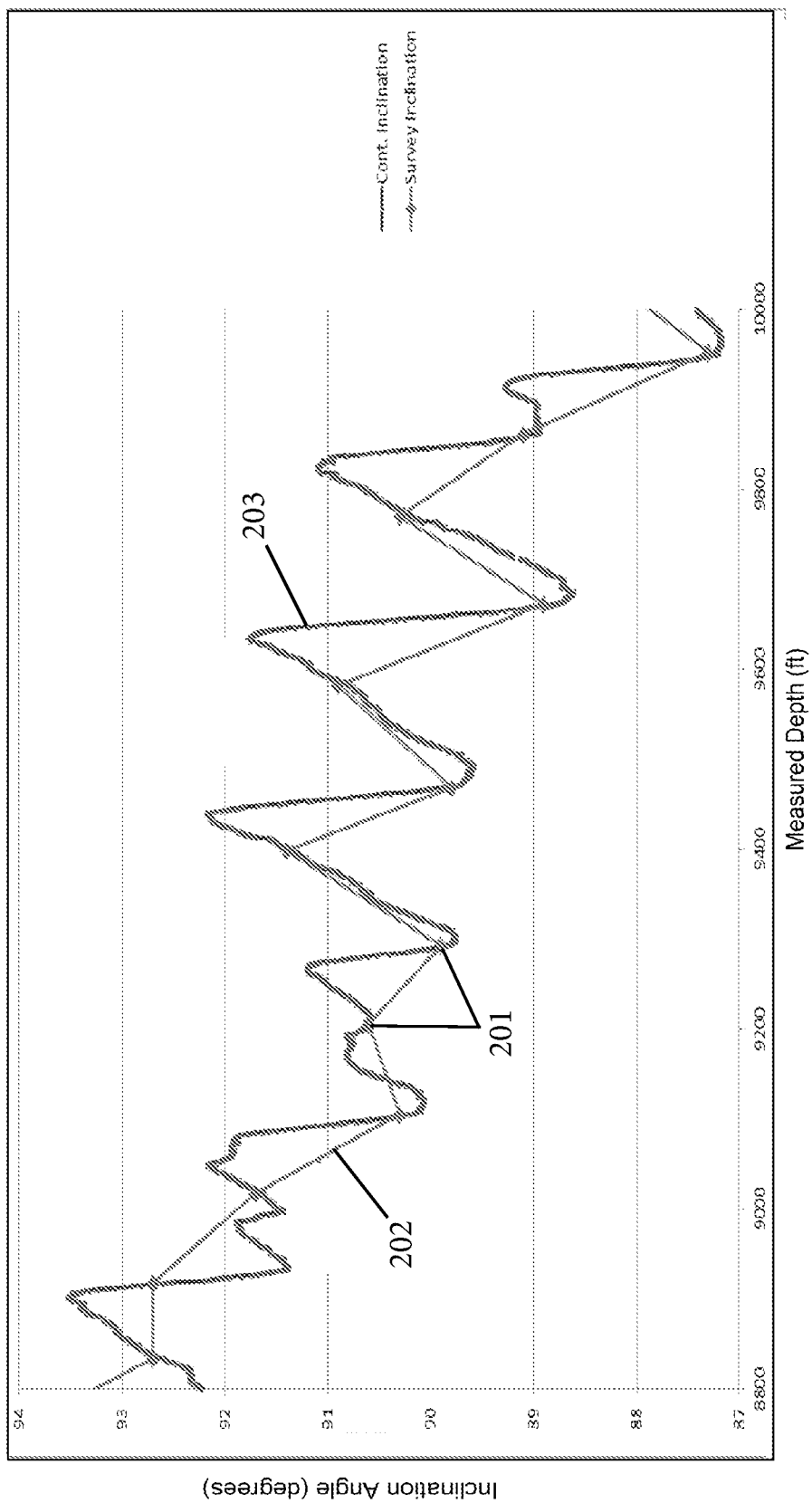
FIG. 2 graphically illustrates a portion of a wellbore profile in terms of inclination vs. measured depth.

Periodic static surveys require assumptions to be made about the wellbore trajectory between survey points, which can result in substantial position errors if those assumptions are incorrect. For example, FIG. 2 graphically illustrates a portion of a wellbore profile in terms of inclination vs. measured depth. Survey points 201 show the inclination values measured at static survey points, which are taken every 90 feet in the example of FIG. 2. Line 202 is used to connect the static values and provide an estimate of inclination values between static survey points. Line 203 shows a continuous measure of inclination, which might be conventionally obtained using a separate gyro survey or which could be obtained according to the methods described herein. As shown in FIG. 2, the variation between line 202 and 203 is significant enough to introduce substantial error into a true vertical depth calculation made using the static survey points alone. The error introduced by the use of static surveys alone (at intervals of about 90 feet) is particularly great in portions of a wellbore having dogleg severities exceeding 6°/100 ft. Well survey analysis has shown that the actual TVD of a horizontal wellbore can be ±30 feet or more from the position calculated using traditional survey methods.

In some cases, after the wellbore is drilled, a separate gyroscopic survey or "gyro" will be performed to provide more accurate positional data. A gyro surveys wellbore position continuously rather than every 90 feet like static surveys. A typical gyro survey can be accurate to within about 0.1% of the total length of the wellbore. As illustrated in FIG. 2, the accuracy of a continuous gyro survey can be much greater than the accuracy of conventional wellbore position and TVD calculations made using periodic static survey measurements alone. Gyro surveys, however, requires the drilling process to be completed or interrupted. The additional time, personnel, and equipment required for an additional gyro survey can result in a significant increase in drilling costs. Further, gyro performance is known to degrade when wellbore inclination reaches 60 degrees, and most gyros cannot be used to survey at greater than 70° inclination.

According to embodiments described herein, the path of the wellbore, in particular the true vertical depth at any point along the wellbore—including portions of the wellbore at or approaching horizontal—can be determined by using continuous inclination measurements to better characterize the wellbore path between static surveys. As a result, error in determining wellbore position and TVD can be significantly reduced, which in turn results in improved well targeting and geosteering and more accurate modeling of individual wellbores and geological regions. In some embodiments, accuracy of wellbore position and TVD using the methods and apparatus described herein can match or even exceed the accuracy levels obtained in a conventional gyro survey, such as within at least 1%, at least 0.5%, at least 0.1%, at least 0.05%, at least 0.01%, at least 0.005%, at least 0.003%, or at least 0.001% of the length of the wellbore portion. This can serve to eliminate the need (and expense) of a separate gyro survey step.

Particular embodiments of the invention can be used to determine TVD in portion of the wellbore having an inclination with respect to vertical that is at least at least 15°, at least 30°, at least 60°, at least 70°, or between about 30° and about 120°. Especially for these portions of the well that are diverted, approaching horizontal, or even completely horizontal, embodiments described herein allow a determination of wellbore position or TVD is accurate to within ±30 feet, ±20 feet, or even ±10 feet. Put another way, in certain embodiments, the ellipsis of uncertainty for the calculated wellbore position in the vertical direction is less than ±30 feet, ±20 feet, or even ±10 feet.

As the term is used herein, "continuous" surveys or measurements are performed as the drilling progresses. Although the actual recorded measurement values are discrete values, the measurement is referred to as "continuous" because the sampling rates can be high enough to reflect any significant changes in the measured value along the wellbore.

A calculation of true vertical depth throughout a wellbore requires the inclination throughout the wellbore, the length of the wellbore (which can be determined by the length of the drill string), and the azimuth along the length of the wellbore. Although azimuth variations can theoretically impact vertical depth calculations, Applicants have determined that as a practical matter this impact is small enough that azimuth variations between static survey points do not introduce a significant amount of error into the calculation of TVD. According to embodiments described herein, static azimuth measurements are taken at the survey points, while azimuth values between the static survey points are interpolated using known methods.

Figure 3:
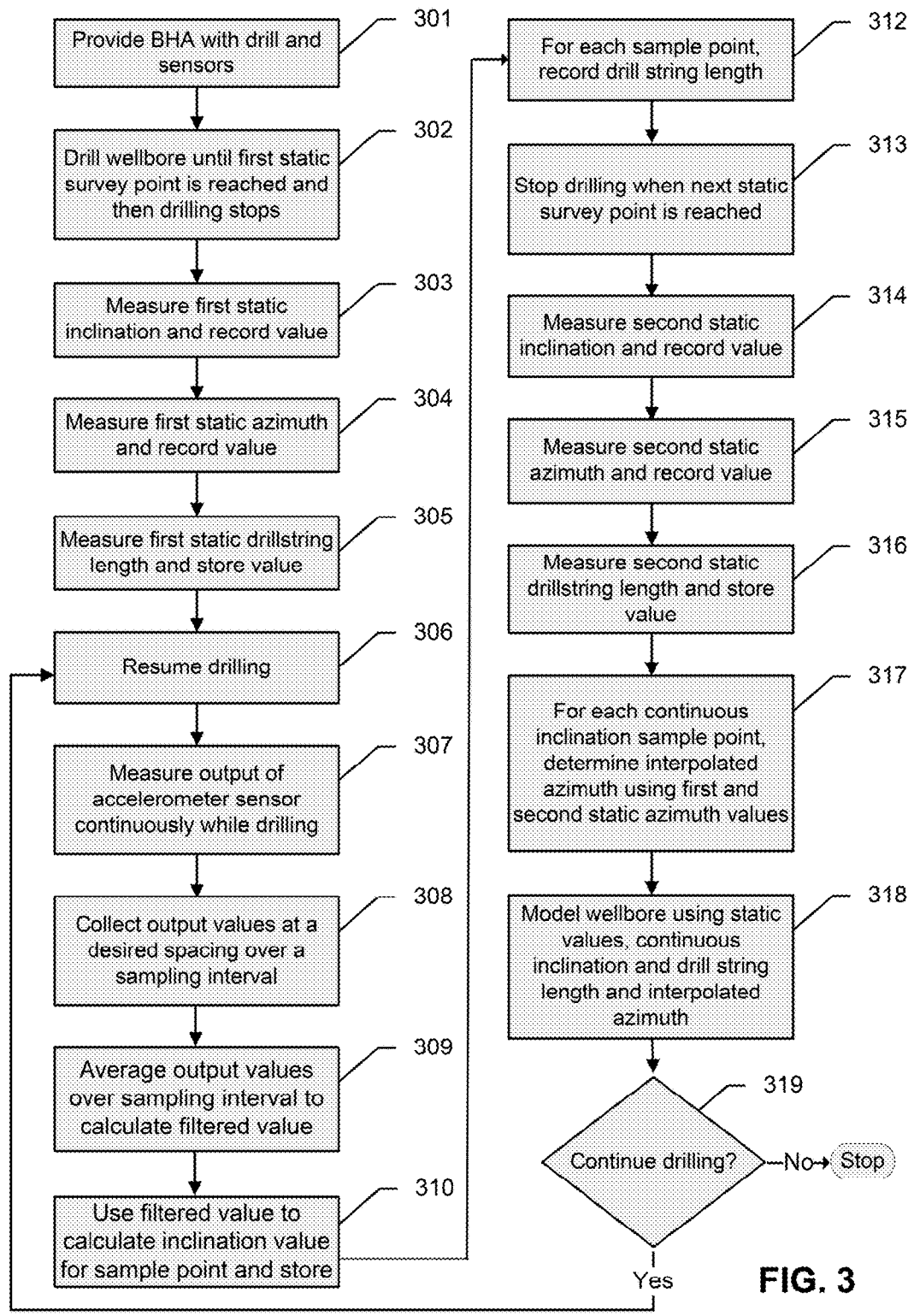
FIG. 3 is a flowchart showing the steps of calculating true vertical depth in a wellbore according to an embodiment.

FIG. 3 is a flowchart showing the steps of calculating true vertical depth in a wellbore according to an embodiment. Well-known or conventional details related to drilling equipment and/or methods are not described in order to avoid obscuring the descriptions herein. In step 301, a drilling string having a bottom hole assembly (BHA) is provided including a drill bit having a cutting face and one or more sensors for measuring linear and gravitational acceleration. As used herein, the BHA can also be referred to as the drilling assembly. Drilling a wellbore typically begins by drilling a vertical portion of the well to a desired depth. As described above, during vertical and near-vertical drilling (at an inclination of less than 15 to 30 degrees) inclination variation in the drilling process will produce deviations in the wellbore that are side-to-side (transverse to the drilling assembly axis). For the purposes of a calculation of true vertical depth, these deviations can largely be ignored.

Any suitable sensors for measuring linear and gravitational acceleration can be used. Specific embodiments, for example, can make use of a standard commercially available directional module having three accelerometers arranged perpendicular to each other along the x, y, and z axes and three magnetometers also arranged perpendicular to each other along the x, y, and z axes. Such directional modules are the industry standard for geosteering applications and are commercially available, for example, from MicroTesla of Houston, Tex., and Applied Physics Systems, Inc., of Sunnyvale, Calif.

In step 302, drilling is commenced and continues until a static survey point is reached. As discussed above, static surveys are performed when drilling is stopped or interrupted, typically every 90 feet. At a static survey point, wellbore inclination and azimuth are determined from the accelerometer and magnetometer values. In some embodiments, the accelerometers along all three axes are used to provide an accurate inclination measurement even if the wellbore is vertical or near vertical at the survey point. In order to determine inclination, in step 303, a static gravitational acceleration measurement (g) is obtained at the survey point while the drill bit is not turning. In step 304, the magnetometer is used to obtain an azimuth value at the survey point. In step 305, the depth of the wellbore can be determined by conventional methods such as monitoring the length of the drillpipe or by using wireline survey tools.

In step 306, after the static survey measurements are completed, drilling is resumed. In step 307, linear acceleration values are determined "continuously" while drilling. As described above, the phrase "continuous inclination measurements" is used to refer to recording accelerometer data while drilling in discrete measurements taken frequently enough (i.e., having a small enough drilling distance between sample points) to adequately reflect changes in the inclination measurements along the wellbore. In step 308, at the desired distance between sample points, the accelerometer output values are collected at a desired sampling rate over a desired sampling time interval, such as at a sampling rate of at least 50 Hz over a time interval of no more than 30 seconds. The recorded values during the sampling interval are then averaged to produce an accelerometer value that has been effectively filtered of data noise produced during drilling. For example, in some embodiments the sample rate can be at least at least 50 Hz, at least 75 Hz, at least 100 Hz, at least 125 Hz, at least 150 Hz, or even at least 200 Hz. In some embodiments, the sampling time interval will be no more than 3 minutes, such as no more than 1 minute, no more than 30 seconds, no more than 15 seconds, no more than 5 seconds, or even no more than 1 second.

In step 309, the recorded values during the sampling interval are then averaged to produce an accelerometer value that has been effectively filtered of data noise produced during drilling. In step 310, once the accelerometer values have been averaged, an inclination value can be calculated using conventional methods to produce a measured inclination value data point corresponding to a particular measured depth. In some embodiments, an inclination value data point can be calculated every 2-3 minutes (which would typically correspond to 2-3 feet drilled). In other words, at a spacing of every 2-3 feet drilled, the calculated inclination value for the most recent sampling interval (for example, the previous minute) is stored for that particular measured depth.

In step 310, for each calculated inclination value, a corresponding measured depth is determined using conventional methods.

Figure 4:
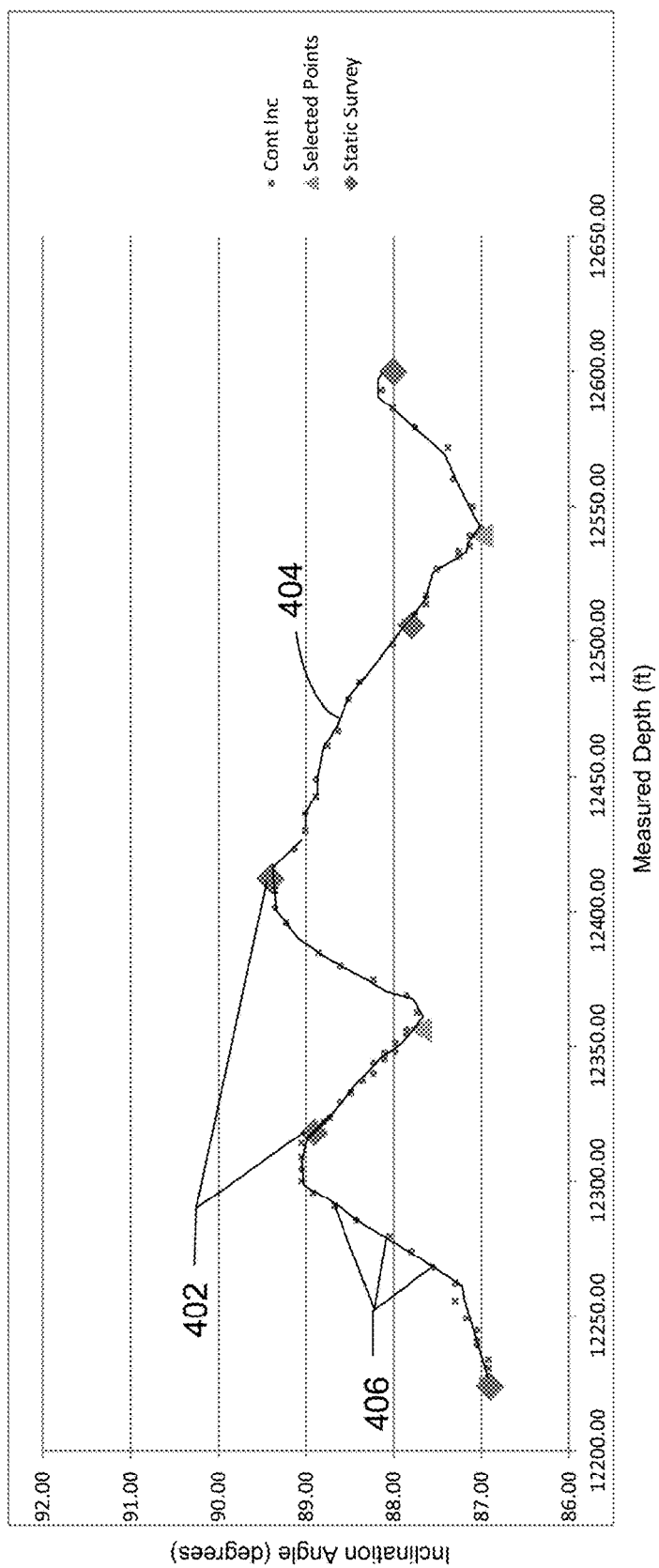
FIG. 4 is a graph of wellbore inclination angle vs. measured depth for a short portion of a typical wellbore.

Referring also to FIG. 4, which is described in greater detail below, curve 401 illustrates the changes in inclination along a small portion of the wellbore. Inclination values should be calculated (and measured depth and azimuth determined) at a sufficient number of data points 406 to accurately show path of the borehole. Applicants have discovered that using data points that are too close together (in other words, too many data points) will introduce artifacts (calculation errors) resulting from the resolution and accuracy of the measurements themselves. For example, for an accelerometer having a resolution (referring to the smallest amount of measurement change that can be reliably detected) of ±0.1 degrees, a much smaller actual inclination change might be "rounded' to a calculated value of 0.1 degrees. If data points were calculated too close together (for example, every 0.1 feet), such a calculated inclination change (0.1 degrees) would be a huge change over such a short distance and would appear to indicate a severe dogleg in the wellbore that would not really be present. Accordingly, persons of skill will recognize that data points should be spaced far enough apart to avoid such artifacts of measurement resolution and accuracy. The desired time interval between data points will be dependent upon penetration rates, but in some embodiments, a data point will be scheduled at an interval of every 30 feet or less, such as every 20 feet, every 10 feet, or every 5 feet.

In some embodiments, steps 307 to 310 can take place at the surface using, for example, a conventional computer system and processor after the data has been transmitted to the surface (for real time calculations during drilling) or after stored memory data is retrieved when the drilling is completed. Alternatively, some or all of steps 307 to 310 can take place downhole using memory storage and data processing components included within the BHA. The decision as to whether to process raw data or estimates downhole in a drilling assembly or by computer at surface can be based on telemetry capacity, microprocessor capacity and/or other considerations.

In some embodiments, data such as a continuous inclination value is transmitted to the surface at desired intervals. For example, if the desired transmission interval is every 5 feet (or approximately 5 minutes at typical drilling rates), once the transmission interval has elapsed, the data from the accelerometer over the most recent sampling period (for example, over the last 30 seconds before the measurement is to be sent) is transmitted to the surface (or averaged and used to calculate a continuous inclination measurement downhole that is then transmitted to the surface). This calculated measurement is coupled with the measured depth to create a data point as shown in FIG. 4. In other embodiments, continuous inclination measurements for multiple data points can be stored and transmitted at longer intervals such as every 20 minutes (or 20 feet drilled). Data from additional MWD sensors can also be transmitted to the surface at the same time as the continuous inclination measurements and/or the calculated TVD.

In some embodiments, continuous inclination data can be continuously collected and stored, even if only the data for the most recent sampling period is transmitted to the surface at the desired transmission interval. In that case, the data stored in downhole memory may have a much higher resolution that the transmitted data. In other embodiments, continuous inclination data is only collected over the sampling interval immediately before data transmission. In that case, the downhole memory resolution will be equivalent to the transmission interval. In particular embodiments, the transmission interval will be greater than or equal to the sampling interval, such as at least 2 times the sampling interval, at least 5 times the sampling interval, at least 10 times the sampling interval, at least 20 times the sampling interval, at least 30 times the sampling interval, or even at least 50 times the sampling interval.

In step 313, drilling is stopped when a next static survey point is reached. In step 314, a static gravitational acceleration measurement (g) is obtained at this survey point while the drill bit is not turning. As discussed above, in step 315, the magnetometer is used to obtain an azimuth value at this survey point and in step 316, the depth of the wellbore is determined.

In order to use the continuous inclination and drillstring length values as a part of a wellbore modeling or a calculation of true vertical depth, azimuth values must also be obtained. Applicants have discovered that azimuth need not be measured continuously, but can instead be interpolated between two successive static survey values without sacrificing significant accuracy in wellbore modeling or TVD calculation. In some embodiments, azimuth can be interpolated using known methods such as interpolating azimuth along the Minimum Radius of Curvature path between static survey points (which assumes that the wellbore course between the survey stations is a smooth arc). In some embodiments, such an interpolation makes use of the measured azimuth values at two static survey points to interpolate the azimuth at positions in between the two static survey points. Accordingly, once the second static azimuth value has been measured, in step 317, an interpolated azimuth value is calculated for each continuous inclination data point in between the two static survey points.

Then, in step 318, the inclination, azimuth, and measured depth values measured at the first and second static points, together with the continuous inclination values, along with corresponding interpolated azimuth values and measured depth values at each of the sample/data points in between the two static survey points, are used to model the wellbore path between the first and second survey points to determine the variation in true vertical depth along that portion of the wellbore path. The path of the wellbore between successive measurement points can be estimated using known methods such as the conventional Minimum Radius of Curvature method.

In step 319, if the wellbore drilling is completed, the process stops. If not, in step 318, the process returns to step 306, and drilling is resumed. The process is then repeated using the values measured at the second static survey point and a third static survey point, along with the continuous inclination values, along with corresponding interpolated azimuth values and measured depth values at each of the sample/data points in between the second and third static survey points. This continues until the desired drilling depth has been reached and the process stops.

FIG. 4 is a graph of wellbore inclination angle vs. measured depth for a short portion of a typical wellbore. Static survey measurements are shown by diamonds 402. Continuous inclination measurements are shown by the data points forming curve 404. Significant continuous inclination data points 406 show significant changes in inclination and thus wellbore character that would not be captured by using only static survey data.

Table 1 below lists the measured values for measured depth (MD), inclination (INC), and azimuth (AMZ) along with a true vertical depth calculated using those measured values. As shown in Table 1, the final calculated true vertical depth is 9578.89 feet.

TABLE 1

Traditional Method

| MD | INC | AZM | TVD |
|---|---|---|---|
| 12224 | 86.9 | 142 | 9568.31 |
| 12318 | 88.9 | 142 | 9571.75 |
| 12412 | 89.4 | 142 | 9573.15 |
| 12506 | 87.8 | 142 | 9575.44 |
| 12600 | 88 | 142 | 9578.89 |

Table 2 below lists the same static measurement values of Table 1 with the addition of a two significant inclination data points (shown in bold and shaded) that significantly deviate from the curve formed by static survey points alone.

TABLE 2

| MD | INC | AZM | TVD |
|---|---|---|---|
| 12224 | 86.9 | 142 | 9568.31 |
| 12318 | 88.9 | 142 | 9571.754 |
| 12356 | 87.7 | 142 | 9572.882 |
| 12412 | 89.4 | 142 | 9574.299 |
| 12506 | 87.8 | 142 | 9576.595 |
| 12539 | 87 | 142 | 9578.092 |
| 12600 | 88 | 142 | 9580.753 |

As shown in Table 2, the final calculated true vertical depth with the addition of just these two additional data points is 9580.753 feet—a difference of 1.863 feet. While this might seem like a minor difference, this simplified example is only showing a small portion (346 feet) of a wellbore having a measured depth of at least 12600 feet. Over the entire length of the wellbore, the use of static surveys alone can result in significant TVD error.

Figure 5A:
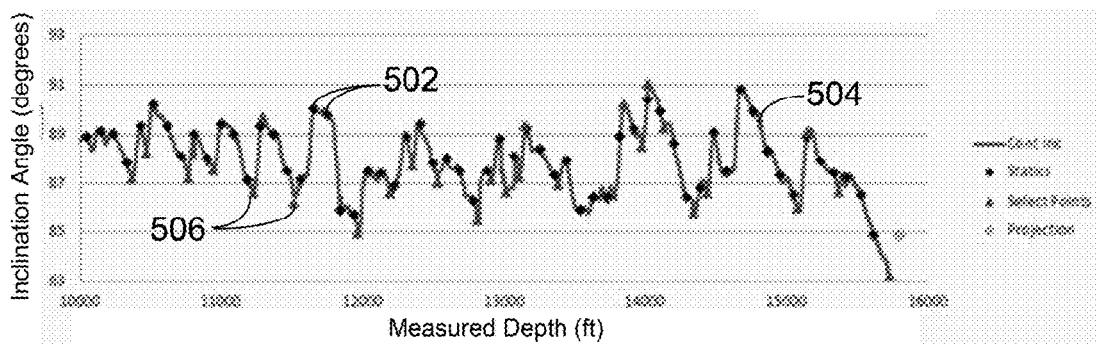
FIG. 5A is a graph showing wellbore inclination angle vs. measured depth for a much larger portion of a wellbore.

FIG. 5A is a graph showing wellbore inclination angle vs. measured depth for a much larger portion of a wellbore. In FIG. 5, static survey measurements are shown by diamonds 502 which, if considered alone, would form a curve similar to curve 201 in FIG. 2. Selected significant continuous inclination data points are shown by triangles 506, which, if considered along with the static survey measurements, form curve 504.

Figure 5B:
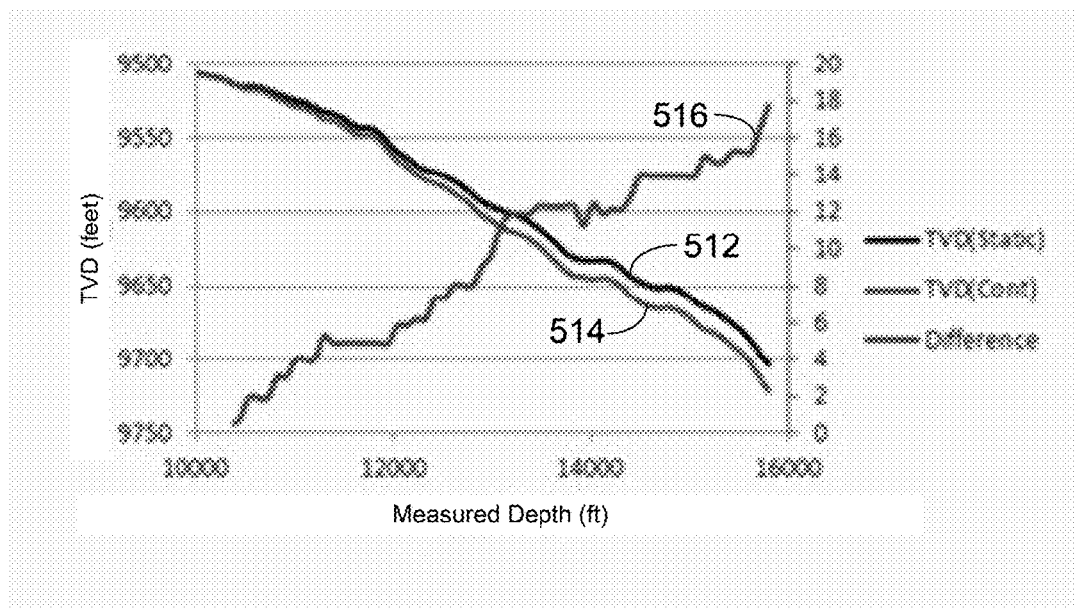
FIG. 5B is a graph showing calculated TVD vs. measured depth (MD) using the inclination valued of FIG. 5A.

FIG. 5B is a graph showing calculated TVD vs. measured depth (MD) using the inclination value of FIG. 5A. Line 512 shows vertical depth calculated using static measurements only. Line 514 shows the calculation of vertical depth using continuous inclination measurements according to an embodiment of the invention described herein. And finally, line 516 shows the difference between the two TVD calculations as the measured depth increases from a little more than 10,000 feet to nearly 16,000 feet. As shown in FIG. 5B, the calculated TVD value using static measurements alone differs from the TVD calculation using continuous inclination measurements by approximately 18 feet over this portion of the wellbore. In some embodiments, significant continuous inclination data points to be added to the TVD calculation can be selected by hand or by a computer algorithm by comparing the curve of continuous inclination to the data curve using only static inclination measurements to find the apexes in the continuous inclination curve where the deviation from the static measurement curve is most pronounced. In other embodiments, all of the continuous inclination data points could be used or data points at a set interval (for example, every 10 feet drilled) could be used.

The present invention has broad applicability and can provide many benefits as described and shown in the examples above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

Embodiments of the present invention are described generally herein in relation to drilling directional wells or unconventional wells, but it should be understood, however, that the methods and the apparatuses described may be equally applicable to other drilling environments. Further, while the descriptions and figures herein show a land-based drilling rig, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Item 1. A method for determining true vertical depth along a wellbore, the method comprising: determining wellbore inclination, azimuth, and drillstring length at a plurality of static survey points; determining inclination at a plurality of positions between two static survey points using continuous inclination measurements obtained while drilling the wellbore; determining an interpolated azimuth value along the minimum curvature wellpath at each of the plurality of positions using the azimuth values determined at the static survey points before and after each of the plurality of positions; determining the drillstring length at each of the plurality of positions; using the inclination, azimuth, and measured depth values measured at the static survey points, together with the continuous inclination values, corresponding interpolated azimuth values, and measured drillstring length at each of the plurality of positions between static survey points to model the wellbore path and determine the variation in true vertical depth along at least a portion of the wellbore.

Item 2. A method of calculating the true vertical depth in a well-bore, the method comprising: providing a bottom hole assembly (BHA) including a drill bit having a cutting face and one or more sensors for measuring linear and gravitational acceleration; drilling the well-bore until a first survey point is reached and measuring static gravitational acceleration measurement (g), azimuth, and depth of the drillstring at the first survey point while the drill bit is not turning; resuming well-bore drilling and determining wellbore inclination at a plurality of positions along the wellbore path while the drill bit is turning to drill the wellbore; stopping drilling once a second survey point is reached and measuring static gravitational acceleration measurement (g), azimuth, and depth of the drillstring at the second survey point while the drill bit is not turning for each wellbore inclination value calculated between the first and second survey points, determining a corresponding interpolated azimuth value from the static azimuth measurements at the first and second survey points; for each wellbore inclination value calculated between the first and second survey points, determining the corresponding measured depth of the drillstring; using the inclination, azimuth, and measured depth values measured at the first and second static points and the wellbore inclination values, along with corresponding interpolated azimuth values and measured depth values, to calculate the true vertical depth of the wellbore from the first survey point to the second survey point; wherein the true vertical depth calculation is accurate to within 0.1% of the wellbore distance drilled.

Item 3. The method of item 1 in which the two static survey points are located in a portion of the wellbore having an inclination that is greater than 15°, greater than 30°, greater than 60°, greater than 70°, or between about 30° and about 120°.

Item 4. Any one of the preceding items in which the determination of the variation in true vertical depth along at least a portion of the wellbore is accurate to within at least 1%, at least 0.5%, at least 0.1%, at least 0.05%, at least 0.01%, at least 0.005%, at least 0.003%, or at least 0.001% of the length of the wellbore portion.

Item 5. Any one of the preceding items in which the determination of the variation in true vertical depth along at least a portion of the wellbore is accurate to within at least 5/1000 feet, at least 3/1000 feet, or at least 1/1000 feet.

Item 6. Any one of the preceding items in which the determination of true vertical depth along at least a portion of the wellbore is accurate to within ±30 feet, ±20 feet, or ±10 feet.

Item 7. Any one of the preceding items in which the ellipsis of uncertainty for the calculated wellbore position in the vertical direction is less than ±30 feet, ±20 feet, or ±10 feet.

Item 8. Any one of the preceding items in which the two static survey points are located in a portion of the wellbore having dogleg severities exceeding 6 degrees/100 feet.

Item 9. Any one of the preceding items in which continuous inclination measurements are taken between survey points only when the wellbore is at an inclination from vertical of at least 15°, at least 30°, at least 60°, or at least 70°.

Item 10. Any one of the preceding items in which continuous inclination measurements are taken between survey points only when the wellbore is at an inclination of at least 30 degrees and no more than 120 degrees from vertical.

Item 11. A method of calculating the true vertical depth along a wellbore, the method comprising:
(a) providing a bottom hole assembly (BHA) including a drill bit having a cutting face and one or more sensors for measuring linear and gravitational acceleration;
(b) drilling a vertical section of a wellbore;
(c) steering the drilling path so that the wellbore reaches an inclination of greater than 15 degrees from vertical;
(d) continuing to drill the well-bore at an inclination of greater than 15 degrees until a first survey point is reached and measuring static gravitational acceleration measurement (g), azimuth, and depth of the drillstring at the first survey point while the drill bit is not turning;
(e) resuming well-bore drilling and determining wellbore inclination at a plurality of positions along the wellbore path while the drill bit is turning to drill the wellbore;
(f) stopping drilling once a second survey point is reached and measuring static gravitational acceleration measurement (g), azimuth, and depth of the drillstring at the second survey point while the drill bit is not turning (g) for each wellbore inclination value calculated between the first and second survey points, determining a corresponding interpolated azimuth value from the static azimuth measurements at the first and second survey points;

(h) for each wellbore inclination value calculated between the first and second survey points, determining the corresponding measured depth of the drillstring;

(i) using the inclination, azimuth, and measured depth values measured at the first and second static points and the wellbore inclination values, along with corresponding interpolated azimuth values and measured depth values, to determine the variation in the true vertical depth of the wellbore from the first survey point to the second survey point.

Item 12. The method of item 11 further comprising repeating steps (d) through (i) as long as the wellbore inclination is at least 15 degrees from vertical.

Item 13. The method of item 11 further comprising repeating steps (d) through (i) as long as the wellbore inclination is at least 30 degrees and no more than 120 degrees from vertical.

Item 14. The method of any one of items 11-13 in which the variation in true vertical depth in portions of the wellbore having an inclination of less than 15 degrees is determined by the length of the drillstring.

Item 15. The method of any one of items 11-14 in which the true vertical depth at any point along the wellbore is determined using continuous inclination measurements taken in portions of the wellbore having an inclination of at least 15 degrees and without using continuous inclination measurements in portions of the wellbore having an inclination of less than 15 degrees.

Item 16. Any one of the preceding items in which determining wellbore inclination comprises determining wellbore inclination from linear acceleration values determined by the one or more sensors for measuring linear and gravitational acceleration.

Item 17. Any one of the preceding items in which determining wellbore inclination at a plurality of positions along the wellbore path comprises for each position sampling the linear acceleration data at a rate of at least 50 Hz over an interval of no more than 3 minutes and averaging the acceleration values to determine a filtered acceleration value, using the filtered acceleration value to determine a wellbore inclination value for each of the plurality of positions along the wellbore path.

Item 18. Any one of the preceding items further comprising reporting measured inclination, azimuth, and drillstring depth at each static survey position and reporting measured inclination and drillstring depth, along with interpolated azimuth values, at a plurality of positions between static survey points.

Item 19. The method of item 18 further comprising reporting the calculated true vertical depth at each static survey position and at each of the plurality of positions between static survey points.

Item 20. A method for determining and reporting true vertical depth along a wellbore, the method comprising: determining wellbore inclination, azimuth, and drillstring length at a plurality of static survey points; determining inclination using continuous inclination measurements obtained while drilling the wellbore, interpolated azimuth values, and drillstring length at each of a plurality of wellbore positions located between static survey points; using the inclination, azimuth, and measured depth values to determine the variation in true vertical depth along the wellbore; and reporting measured inclination, azimuth, drillstring depth, and true vertical depth at each static survey position and reporting measured inclination, drillstring depth, interpolated azimuth and true vertical depth, at a plurality of positions between static survey points.

Item 21. The method of item 20 in which reported true vertical depth values are accurate to within at least 1%, at least 0.5%, at least 0.1%, or at least 0.005% of the length of the wellbore.

Item 22. A system for determining the true vertical depth of a well-bore, the system comprising: a bottom hole assembly (BHA) including a drill bit having a cutting face and one or more sensors for continuously measuring linear and gravitational acceleration; and a processor for receiving the gravitational acceleration data, azimuth, and depth of the drillstring at a first survey point, said gravitational acceleration data and azimuth being measured while the drill bit is not turning; receiving the gravitational acceleration data, azimuth, and depth of the drillstring at a second survey point, said gravitational acceleration data and azimuth being measured while the drill bit is not turning; receiving linear acceleration data at a plurality of positions between static survey points, the linear acceleration data being obtained while the drill bit is being used to drill a wellbore from the first survey point to the second survey point; calculating an inclination value at each of the plurality of positions between static survey points; calculating an interpolated azimuth value at each of the plurality of positions between static survey points from the azimuth values at the first and second survey points; using the inclination, azimuth, and measured depth values measured at the static survey points, together with the continuous inclination values, corresponding interpolated azimuth values, and measured drillstring length at each of the plurality of positions between static survey points to model the wellbore path and determine the variation in true vertical depth along the wellbore from the first survey point to the second survey point.

I claim as follows:

1. A method for determining true vertical depth along a wellbore, the method comprising:
    determining wellbore inclination, azimuth, and drillstring length at a plurality of static survey points, the determining wellbore inclination further comprising determining wellbore inclination from linear acceleration values determined by one or more sensors for measuring linear and gravitational acceleration;
    determining inclination at a plurality of positions between two static survey points using continuous inclination measurements obtained while drilling the wellbore;
    determining an interpolated azimuth value along a minimum curvature of a wellbore path at each of the plurality of positions using the azimuth values determined at the static survey points before and after each of the plurality of positions;
    determining the drillstring length at each of the plurality of positions; and
    using the inclination, azimuth, and measured depth values measured at the static survey points, together with continuous inclination values, corresponding interpolated azimuth values, and measured drillstring length at each of the plurality of positions between static survey points to model the wellbore path and determine a variation in true vertical depth along at least a portion of the wellbore.

2. The method of claim 1 in which the two static survey points are located in a portion of the wellbore having an inclination that is greater than 15°, greater than 30°, greater than 60°, greater than 70°, or between about 30° and about 120°.

3. The method of claim 1 in which the determination of the variation in true vertical depth along at least a portion of the wellbore is accurate to within at least 1%, at least 0.5%, at least 0.1%, at least 0.05%, at least 0.01%, at least 0.005%, at least 0.003%, or at least 0.001% of the length of the wellbore portion.

4. The method of claim 1 in which the determination of the variation in true vertical depth along at least a portion of the wellbore is accurate to within at least 5/1000 feet, at least 3/1000 feet, or at least 1/1000 feet.

5. The method of claim 1 in which determination of the true vertical depth along at least a portion of the wellbore is accurate to within ±30 feet, ±20 feet, or ±10 feet.

6. The method of claim 1 in which an ellipsis of uncertainty for a calculated wellbore position in a vertical direction is less than ±30 feet, ±20 feet, or ±10 feet.

7. The method of claim 1 in which the two static survey points are located in a portion of the wellbore having dogleg severities exceeding 6 degrees/100 feet.

8. The method of claim 1 in which continuous inclination measurements are taken between survey points only when the wellbore is at an inclination from vertical of at least 15°, at least 30°, at least 60°, or at least 70°.

9. The method of claim 1 in which continuous inclination measurements are taken between survey points only when the wellbore is at an inclination of at least 30 degrees and no more than 120 degrees from vertical.

10. The method of claim 1 further comprising reporting measured inclination, azimuth, and drillstring depth at each static survey position and reporting measured inclination and drillstring depth, along with interpolated azimuth values, at a plurality of positions between static survey points.

11. The method of claim 10 further comprising reporting a calculated true vertical depth at each static survey position and at each of the plurality of positions between static survey points.

12. A method of calculating true vertical depth in a wellbore, the method comprising:
  providing a bottom hole assembly (BHA) including a drill bit having a cutting face and one or more sensors for measuring linear and gravitational acceleration;
  drilling, via a drillstring, the wellbore until a first survey point is reached and measuring static gravitational acceleration measurement (g), azimuth, and depth of the drillstring at the first survey point while the drill bit is not turning;
  resuming wellbore drilling and determining wellbore inclination at a plurality of positions along a wellbore path while the drill bit is turning to drill the wellbore;
  stopping drilling once a second survey point is reached and measuring static gravitational acceleration measurement (g), azimuth, and depth of the drillstring at the second survey point while the drill bit is not turning
  for each wellbore inclination value calculated between the first and second survey points, determining a corresponding interpolated azimuth value from the static azimuth measurements at the first and second survey points;
  for each wellbore inclination value calculated between the first and second survey points, determining a corresponding measured depth of the drillstring;
  using the inclination, azimuth, and measured depth values measured at the first and second survey points and the wellbore inclination values, along with corresponding interpolated azimuth values and measured depth values, to calculate the true vertical depth of the wellbore from the first survey point to the second survey point; and
  wherein the calculated true vertical depth is accurate to within 0.1% of a wellbore distance drilled.

13. A method for determining true vertical depth along a wellbore, the method comprising:
  determining wellbore inclination, azimuth, and drillstring length at a plurality of static survey points;
  determining inclination at a plurality of positions between two static survey points using continuous inclination measurements obtained while drilling the wellbore, and for each position sampling linear acceleration data at a rate of at least 50 Hz over an interval of no more than 3 minutes and averaging the linear acceleration data to determine a filtered acceleration value, using the filtered acceleration value to determine a wellbore inclination value for each of the plurality of positions along a wellbore path;
  determining an interpolated azimuth value along a minimum curvature of the wellbore path at each of the plurality of positions using the azimuth determined at the static survey points before and after each of the plurality of positions;
  determining the drillstring length at each of the plurality of positions; and
  using the inclination, azimuth, and measured depth values measured at the static survey points, together with continuous inclination values, corresponding interpolated azimuth values, and measured drillstring length at each of the plurality of positions between static survey points to model the wellbore path and determine a variation in the true vertical depth along at least a portion of the wellbore.

14. A method of calculating true vertical depth along a wellbore, the method comprising:
  (a) providing a bottom hole assembly (BHA) including a drill bit having a cutting face and one or more sensors for measuring linear and gravitational acceleration;
  (b) drilling, via a drillstring, a vertical section of a wellbore;
  (c) steering a drilling path so that the wellbore reaches an inclination of greater than 15 degrees from vertical;
  (d) continuing to drill the wellbore at an inclination of greater than 15 degrees until a first survey point is reached and measuring static gravitational acceleration measurement (g), azimuth, and depth of the drillstring at the first survey point while the drill bit is not turning;
  (e) resuming wellbore drilling and determining wellbore inclination at a plurality of positions along a wellbore path while the drill bit is turning to drill the wellbore;
  (f) stopping drilling once a second survey point is reached and measuring static gravitational acceleration measurement (g), azimuth, and depth of the drillstring at the second survey point while the drill bit is not turning (g) for each wellbore inclination value calculated between the first and second survey points, determining a corresponding interpolated azimuth value from the static azimuth measurements at the first and second survey points;
  (h) for each wellbore inclination value calculated between the first and second survey points, determining a corresponding measured depth of the drillstring; and (i) using the inclination, azimuth, and measured depth values measured at the first and second survey points and the wellbore inclination values, along with corresponding interpolated azimuth values and measured depth values, to determine a variation in the true vertical depth of the wellbore from the first survey point to the second survey point.

15. The method of claim 14 further comprising repeating steps (d) through (i) as long as the wellbore inclination is at least 15 degrees from vertical.

16. The method of claim 14 further comprising repeating steps (d) through (i) as long as the wellbore inclination is at least 30 degrees and no more than 120 degrees from vertical.

17. The method of claim 14 in which the variation in the true vertical depth in portions of the wellbore having an inclination of less than 15 degrees is determined by a length of the drillstring.

18. The method of claim 14 in which the true vertical depth at any point along the wellbore is determined using continuous inclination measurements taken in portions of the wellbore having an inclination of at least 15 degrees and without using continuous inclination measurements in portions of the wellbore having an inclination of less than 15 degrees.

19. The method of claim 14 in which reported true vertical depth values are accurate to within at least 1%, at least 0.5%, at least 0.1%, or at least 0.005% of a length of a wellbore.

* * * * *